United States Patent
Wong et al.

(10) Patent No.: US 7,526,791 B2
(45) Date of Patent: Apr. 28, 2009

(54) SYSTEM AND METHOD FOR AN INTERACTIVE BROADBAND SYSTEM-ON-CHIP WITH A RECONFIGURABLE INTERFACE

(75) Inventors: Jorge Juan Wong, Mission Viejo, CA (US); Dave Datphuoc Huynh, Irvine, CA (US); Thomas Lee Spieker, San Juan Capistrano, CA (US)

(73) Assignee: Broadcom Corporation, Irvine, CA (US)

( * ) Notice: Subject to any disclaimer, the term of this patent is extended or adjusted under 35 U.S.C. 154(b) by 1283 days.

(21) Appl. No.: 10/202,124

(22) Filed: Jul. 24, 2002

(65) Prior Publication Data

US 2004/0019913 A1      Jan. 29, 2004

(51) Int. Cl.
*H04N 7/16* (2006.01)
(52) U.S. Cl. ......................... 725/152; 725/151; 725/153
(58) Field of Classification Search ................. 725/151, 725/152, 153; 712/38, 39
See application file for complete search history.

(56) References Cited

U.S. PATENT DOCUMENTS 6,550,008 B1 * 4/2003 Zhang et al. ................ 713/155
7,024,683 B1 * 4/2006 Gee, Jr. ...................... 725/132

OTHER PUBLICATIONS

D'Luna, et al., A Single Chip Universal Cable Set-Top Box/Modem Transceiver, IEEE Journal of Solid-State Circuits, vol. 34, No. 11, Nov. 1999, pp. 16471660.*
PCMCIA/JEITA, "PC Card Standard, 8.0 Release"—Specification (Apr. 2001).

* cited by examiner

*Primary Examiner*—Christopher Kelley
*Assistant Examiner*—Timothy R Newlin
(74) *Attorney, Agent, or Firm*—McAndrews Held & Malloy Ltd.

(57) ABSTRACT

A method and apparatus are disclosed, in an interactive broadband set-top box receiving broadband signals from a headend, to facilitate communications with an installed card within the set-top box using a single IC chip that processes the broadband signals. The single IC chip is configured to a PCMCIA PC-card mode such that PC card signals are multiplexed to certain I/O pins of the single IC chip. In the PCMCIA PC-card mode, the single IC chip attempts to detect the presence of and identify an installed card in the set-top box. If an installed card is present and is identified as a POD module, then the single IC chip is reconfigured from the PCMCIA PC-card mode to a POD mode such that POD-compatible signals are multiplexed to certain existing I/O pins of the single IC chip when operating in the POD mode.

14 Claims, 5 Drawing Sheets

Set the following parameters in the EBI_Chip_ Select_ Control_ Register to
select different configuratio

| CS_Ctrl_reg parameters | PC Card Configuration | POD Configuration |
|---|---|---|
| MEMIO | 1 | 1 |
| TaWait | 1 | 1 |
| WP | 0 | 0 |
| WaitCount[4:0] | 6 | 12 |
| THold[3:0] | 0 | 6 |
| TSetup[3:0] | 1 | 2 |
| CSHold | 1 | 1 |
| SplitCS | 1 | 1 |
| MaskEn | 0 | 0 |
| NESample | 0 | 0 |
| M68k | 0 | 0 |
| LE | # | # |
| Fifo Enable | 0 | 0 |
| SizeSel | x | x |
| Sync | x | x |
| Polarity | 0 | 0 |
| WECtl | 1=I/O, 0=MEM | 1=I/O, 0=MEM |
| DestSize | 1 | 1 |
| LSINH | 0 | 0 |
| TSEn | 0 | 0 |
| Enable | 1 | 1 |

\# := a value for these bits may be selected depending on system requirements
x := value not used in this mode; any value will do
40.5 MHz EBI_CLK assumed. Fewer wait states may be applied for 27 MHz.

FIG. 3

| Single IC Chip (POD or PC Card) | POD module | Dir (wrt single IC) | PC Card | Dir (wrt single IC) | Single IC (actual pins) |
|---|---|---|---|---|---|
| EBI | CPU | | CPU | | |
| GND, or GPIO | REG_N | O | REG_N | O | GND on the board |
| EBI_CSb[x] | CE1_N | O | CE1_N | O | |
| EBI_CSb[y] | CE2_N | O | CE2_N | O | |
| EBI_RDb | OE_N | O | OE_N | O | |
| EBI_WEb[0] | WE_N | O | WE_N | O | |
| EBI_DSb | IORD_N | O | IORD_N | O | |
| EBI_WEb[1] | IOWR_N | O | IOWR_N | O | |
| Not connected | INPACK_N | I | INPACK_N | I | |
| EBI_IRQ[n] | IREQ_N(READY) | I | IREQ_N(READY) | I | |
| EBI_TAb (or EBI_TA2 on GPIO) | WAIT_N | I | WAIT_N | I | EBI_TA2 (GPIO[23]) |
| Not connected | IOIS16_N | I | IOIS16_N | I | |
| GPIO | RESET_N | O | RESET_N | O | GPIO[16] |
| Not connected | VS1_N | I | VS1_N | O | |
| Not connected | VS2_N | I | VS2_N | I | |
| GPIO | CD1_N | I | CD1_N | I | GPIO[15] |
| GPIO | CD2_N | I | CD2_N | I | GPIO[14] |
| EBI_DATA[7:0] | D[7,0] | I/O | D[7:0] | I/O | |
| EBI_ADDR[3:0] | A[3:0] | O | A[3:0] | O | |
| EBI_ADDR[13:10] | A[13:10] | O | A[13:10] | O | |
| OOB | OOB | | OOB | | |
| TXCLK or EBI_ADDR[4] | CTX or A[4] | O | A[4] | O | TX_CLK |
| TXIRAIL or EBI_ADDR[5] | ITX or A[5] | I | A[5] | O | TX_I |
| TXENABLE or EBI_ADDR[6] | ETX or A[6] | I | A[6] | O | TX_ENABb |
| TXQRAIL or EBI_ADDR[7] | QTX or A[7] | I | A[7] | O | TX_Q |
| OBCLK or EBI_ADDR[8] | CRX or A[8] | O | A[8] | O | OB_CLK |
| OBDAT or EBI_ADDR[9] | DRX or A[9] | O | A[9] | O | OB_SDATA |
| INBAND | INBAND | | INBAND | | |
| PS_CLK or EBI_ADDR[15] | MCLKI or A[15] | O | A[15] | O | DS1_CLK |
| PS_VAL or EBI_ADDR[16] | MIVAL or A[16] | O | A[16] | O | MII_COL |
| PS_SYNC or EBI_ADDR[17] | MISTRT or A[17] | O | A[17] | O | DS1_SYNC |
| PS_DATA[0] or EBI_ADDR[18] | MDI[0] or A[18] | O | A[18] | O | DS1_SDATA |
| PS_DATA[7:1] or EBI_ADDR[25:19] | MDI[7:1] or A[25:19] | O | A[25:19] | | O{MII_TXCLK, MII_RXCLK, MII_RXEN, MII_RXD[3:0]} |
| PKT_CLK or EBI_ADDR[14] | MCLKO or A[14] | I | A[14] | O | DS2_CLK |
| PKT_VAL | MOVAL or BVD2 | I | BVD2 | I | MII_TXEN |
| PKT_SYNC | MOSTRT or BVD1 | I | BVD1 | I | MII_TXER |
| PKT_DATA[0] or EBI_DATA[8] | MDO[0] | I | D[8] | I/O | POD_PKT_DATA[0] (GPIO24) |
| PKT_DATA[7:1] or EBI_DATA[15:9] | MDO[7:1] | I | D[15:9] | I/O | {DM_GRANT_RCV[4:0], DM_TICK_CLK, DM_NET_GATE_EN} |
| POWER CONTROL | POWER CONTROL | | POWER CONTROL | | |
| GPIO | VCC on/off | O | VCC on/off | O | GPIO[13] |

Boxed pin groups should have independent mux selection control

FIG. 4

SYSTEM AND METHOD FOR AN INTERACTIVE BROADBAND SYSTEM-ON-CHIP WITH A RECONFIGURABLE INTERFACE

CROSS REFERENCE TO RELATED APPLICATIONS

This application is related to application Ser. No. 09/969,212 filed Oct. 2, 2001, titled "SINGLE CHIP SET-TOP BOX SYSTEM", the complete subject matter of which is incorporated herein by reference in its entirety.

BACKGROUND OF THE INVENTION

Embodiments of the present invention relate generally to integrated circuits and systems, and more particularly to an interactive broadband set-top box on a single integrated circuit (IC) chip.

In general, a set-top box interfaces with RF devices to receive and process audio, video, data, and/or graphics information for display on a display device such as a high definition television, standard definition television, or a computer monitor. The video and graphics signals transmitted to the display device by the set-top box may comprise, for example, RGB, NTSC, PAL, SECAM, ATSC, S-video, and DVI-compatible signals as well as any other standard or non-standard video and/or graphics signals.

The audio, video, data, and/or graphics information may originate, for example, at a cable headend. A headend is the mainframe of a cable television system where inputs from satellites, local signals, and other sources are combined, balanced, and amplified for subsequent distribution to customers on a single cable. The headend includes various RF devices including antennas, preamplifiers, frequency converters, demodulators, modulators, processors, and other related devices. However, as used herein from this point forward, the term "headend" is used generally to simply indicate a source of audio, video, data, and/or graphics information.

A set-top box system may receive audio, video, data, and/or graphics information using any combination of available communication media such as, for example, cable, landline (eg. PSTN, ISDN, DSL), Internet, satellite links, free space, wireless links, and the like. The set-top box system may interface to a memory device to store data during audio, video, data, and/or graphics processing.

Conventional set-top boxes may include various discrete and separate elements. For example, a typical set-top box may include a broadband receiver, an MPEG decoder, a video encoder, an upstream RF transmitter, and a CPU all implemented on separate integrated circuit (IC) chips or systems. Also, a set-top box may include peripheral interfaces including PCMCIA-compatible interfaces and a POD interface implemented on separate chips or systems.

Peripheral interfaces may include various types of installed PC cards that are communicated to/from using a PCMCIA (Personal Computer Memory Card International Association) standard communication protocol. The purpose of the PCMCIA protocol is to support the interoperability of PC cards in computers, automobiles, cable TV, digital cameras, and set-top box systems. The PCMCIA protocol defines the electrical interface, associated software, socket design, and physical size of the cards and, as an example, may be in compliance with PC Card Standard 8.0 Release, Apr. 2001 which is incorporated by reference herein in its entirety. Some examples of PC cards include memory cards, modems, sound cards, floppy disk controllers, hard drives, CD ROM and SCSI controllers, GPS cards, data acquisition and LAN cards, pagers, radios, wireless network cards, etc.

Also, peripheral interfaces may include a point-of-deployment (POD) interface. A POD module is a programmable card that may be installed in a set-top box system and is communicated to/from using a POD communication protocol through the POD interface. The functions of the POD module are to receive, de-encrypt, and transmit parallel MPEG transport streams and receive, process, and transmit out-of-band (OOB) signals.

A cable provider may download data to the POD module using the OOB channels to, for example, enable pay-per-view channels requested by a user. The POD module may transmit upstream signals through the POD interface using the OOB channels to provide requests and status information to the cable provider, for example, such that a user's account may be updated. As an example, the POD protocol may be in compliance with OpenCable™ Host-POD Interface Specification IS-POD-131-INT07-010803, dated Aug. 3, 2001 which is incorporated herein by reference in its entirety.

Further limitations and disadvantages of conventional and traditional approaches will become apparent to one of skill in the art, through comparison of such systems with embodiments of the present invention as set forth in the remainder of the present application with reference to the drawings.

BRIEF SUMMARY OF THE INVENTION

Certain embodiments of the present invention provide a method and apparatus, in an interactive broadband set-top box receiving broadband signals from, for example, a headend, to facilitate communications with an installed card within the set-top box using a single IC chip that processes the broadband signals.

A method of the present invention provides for configuring a single IC chip to a PCMCIA PC-card mode such that certain existing I/O pins of the single IC chip carry PC card signals when operating in the PCMCIA PC-card mode. The single IC chip may detect the presence of an installed card interfacing to the single IC chip and may identify the installed card as a PC card or a POD module. The single IC chip may be reconfigured from the PCMCIA PC-card mode to a POD mode, if the installed card is identified as a POD module, such that POD-compatible signals are multiplexed to certain existing I/O pins of the single IC chip when operating in the POD mode.

Apparatus of the present invention provides, within a single IC chip, a broadband digital signal processing module (BDSPM) to process broadband signals. The apparatus also provides, within the single IC chip, a PC-card/POD interface module (PPIM) interfacing to the BDSPM. The PPIM is capable of being configured to operate in a PCMCIA PC-card mode or a POD mode, along with the BDSPM, in order to communicate with an installed card in an interactive broadband set-top box by multiplexing signals onto shared I/O pins of the single IC chip.

Certain embodiments of the present invention afford an approach for a single IC chip to multiplex certain I/O pins between PC card signals and POD-compatible signals in order to communicate with a PCMCIA module or a POD module installed in an interactive broadband set-top box.

These and other advantages and novel features of the present invention, as well as details of an illustrated embodiment thereof, will be more fully understood from the following description and drawings.

BRIEF DESCRIPTION OF THE DRAWINGS

FIG. 3 is a table illustrating how to configure a control register in the single IC chip apparatus of FIG. 1 in order to switch between a PCMCIA PC-card configuration and a POD configuration in accordance with an embodiment of the present invention.

FIG. 4 is a table illustrating the various POD or PC-card signals that may be multiplexed onto certain I/O pins of the single IC chip apparatus of FIG. 1 in accordance with an embodiment of the present invention.

DETAILED DESCRIPTION OF THE INVENTION

Integrating the functionality of various set-top box system elements on a single IC chip reduces fabrication time, fabrication cost, and maintenance cost. Application Ser. No. 09/969,212 filed Oct. 2, 2001, titled "SINGLE CHIP SET-TOP BOX SYSTEM" describes the integration of many of the set-top box functional elements into a single IC chip.

It is desirable, however, to have a single set-top box chip that is able to interface directly to an installed PC card or an installed POD-compatible module simply by changing a programmable configuration or mode of the single IC chip.

Figure 1:
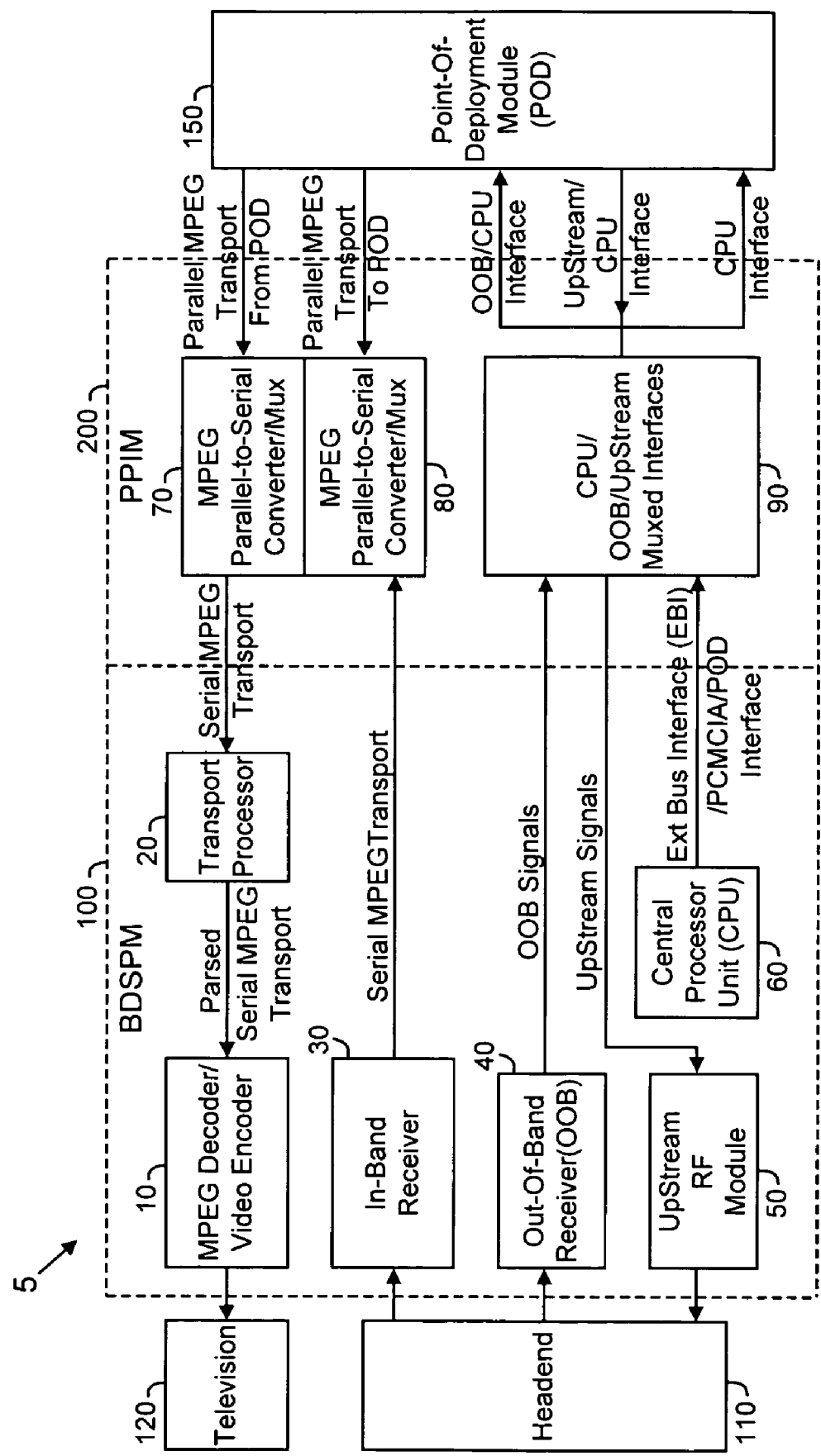
FIG. 1 is a schematic block diagram of a single IC chip apparatus processing broadband signals from a headend and interfacing to a POD module in accordance with an embodiment of the present invention.

FIG. 1 is a schematic block diagram of a single IC chip 5 in a set-top box and processing broadband signals from a headend 110 and interfacing to a POD module 150 in accordance with an embodiment of the present invention. The single IC chip 5 may also interface to certain PC cards as well.

In an embodiment of the present invention, the single IC chip 5 comprises two main sections including a Broadband Digital Signal Processing module (BDSPM) 100 and a PC-card/POD Interface Module (PPIM). The BDSPM 100 receives broadband audio, video, data, and/or graphics information from a headend 110, processes the information, interfaces to PPIM 200 within the single IC chip 5, outputs upstream RF signals to the headend 110, and outputs other signals for display to, for example, a television 120. The PPIM 200 receives/transmits signals from/to the BDSPM 100 and multiplexes the appropriate signals to I/O pins of the single IC chip 5 such that the single IC chip 5 may interface to a PC card or a POD module installed in the set-top box.

In an embodiment of the present invention, the BDSPM 100 comprises an MPEG decoder/video encoder 10, a transport processor 20, an in-band receiver 30, and out-of-band receiver 40, and a CPU 60.

During operation of the single IC chip 5 in a set-top box, broadband signals are received by the BDSPM 100 in the form of in-band signals and out-of-band signals. The in-band signals are received by in-band receiver 30 which generates a digital serial MPEG transport stream from the received in-band signals. In an embodiment of the present invention, in-band receiver 30 comprises a QAM receiver. The out-of-band signals are received by OOB receiver 40 which generates digital OOB signals. In an embodiment of the present invention, the OOB receiver 40 comprises a QPSK receiver.

The CPU 60 controls the functionality of the single IC chip 5 by generating various control signals within the chip. Digital upstream signals, generated by a POD module 150 external to the single IC chip 5, may be converted to upstream RF signals by upstream RF module 50 and transmitted to the headend 110. Upstream RF module 50 may comprise a QPSK/16-QAM upstream transmitter in accordance with an embodiment of the present invention.

In an embodiment of the present invention, the transport processor 20 receives a serial MPEG transport stream from the PPIM 200. The serial MPEG transport stream may include one or more in-band streams (high data rate streams such as audio or video data). The transport processor 20 may perform one or more of, but not limited to, signal parsing, PID filtering, encrypting, de-encrypting, and packet buffering of the received serial MPEG transport stream. In one embodiment of the present invention, the transport processor 20 transmits a de-encrypted, parsed serial MPEG transport stream to MPEG Decoder/Video Encoder 10 for audio and video decoding (i.e. decompression).

MPEG Decoder/Video Encoder 10 performs dual functions. The MPEG decoder section receives compressed signals from a parsed serial MPEG transport stream and performs signal decompression. The signal decompression operation may, in an embodiment of the present invention, decode a compressed video signal of the parsed serial MPEG transport stream into a CCIR-656 standard digital signal. In other embodiments, the MPEG decoder may format the compressed signals into other types of decompressed signal formats.

In an embodiment of the present invention, the video encoder section of the MPEG Decoder/Video Encoder 10 receives a video signal (e.g. a CCIR-656 stream) as a parsed serial MPEG transport stream and encodes the received video signal by converting it to, for example, a NTSC or PAL video signal for display.

FIG. 1 shows the BDSPM 100 and PPIM 200 of the single IC chip 5 configured in the POD mode as opposed to the PCMCIA PC-card mode. In accordance with an embodiment of the present invention, the single IC chip 5 may be configured to either the POD mode or the PCMCIA PC-card mode.

Figure 2:
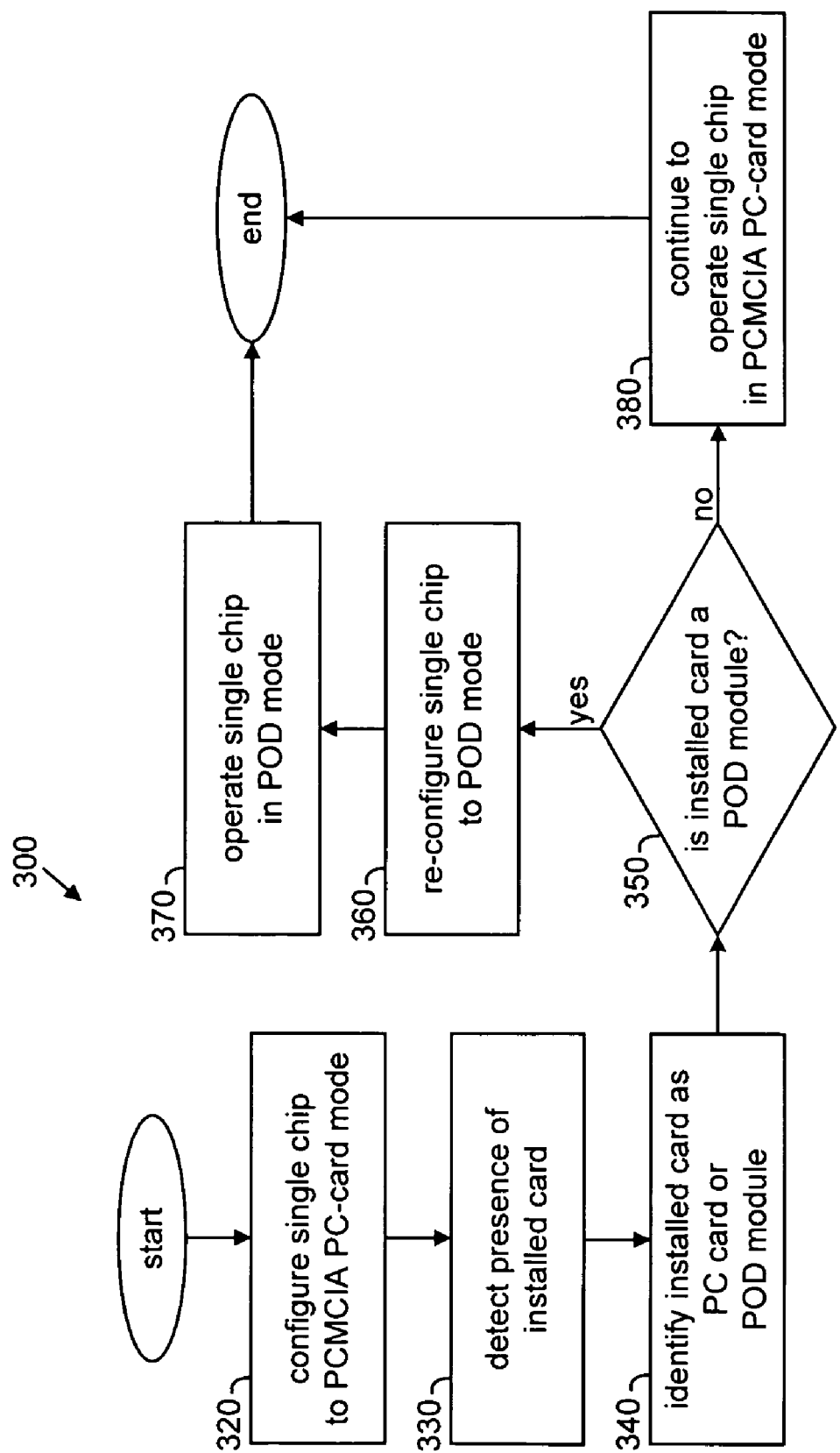
FIG. 2 is a flowchart of a method to reconfigure the single IC chip apparatus in FIG. 1 from a PCMCIA PC-card mode to a POD mode in accordance with an embodiment of the present invention.

In an embodiment of the present invention, the BDSPM 100 of the single IC chip 5 processes broadband signals received from the headend as previously described. Referring to FIG. 2, in step 320 of method 300, the BDSPM 100 and PPIM 200 of the single IC chip 5 are configured to the PCMCIA PC-card mode by CPU 60 by configuring a control register in the BDSPM 100, as shown in FIG. 3, for the PCMCIA PC-card mode.

While in the PCMCIA PC-card mode, the CPU 60 detects the presence of an installed card 150 (such as a POD module or a PC card) in step 330. If the CPU 60 detects the presence of an installed card 150, then the CPU 60 reads an identification register in installed card 150 and identifies the installed card as a particular PC card or a POD module in step 340.

In step 350, if the installed card 150 is a POD module, then the CPU reconfigures the BDSPM 100 and PPIM 200 in single IC chip 5 to the POD mode by configuring a control register in the BDSPM 100, as shown in FIG. 3, for the POD mode (step 360 in FIG. 2). In accordance with an embodiment of the present invention, when configured to the POD mode, the single IC chip 5 will operate in the POD mode in compliance with OpenCable™ Host-POD Interface Specification IS-POD-131-INT07-010803, dated Aug. 3, 2001 (step 370 in FIG. 2). Otherwise, the single IC chip 5 remains in the PCMCIA PC-card mode and operates in compliance with PC Card Standard 8.0 Release, Apr. 2001 (step 380 in FIG. 2) in accordance with an embodiment of the present invention. Other embodiments complying with other standards and/or specifications are possible as well.

FIG. 4 is a table illustrating the various POD or PC card signals that may be multiplexed onto certain I/O pins of the single IC chip 5 of FIG. 1 in accordance with an embodiment of the present invention. The signals and pins that are boxed are multiplexed between PC card signals and POD signals depending on the mode of operation (PCMCIA PC-card or POD). The direction of the signals (input, output or both) with respect to the single IC chip 5 is also shown in FIG. 4.

For example, in the POD mode, the TX_CLK pin carries a clock signal from the single IC chip 5 to the POD module 150 and the TX_I, TX_Q, and TX_ENABb pins carry data from the POD module 5 to the single IC chip 5. In the PCMCIA PC-card mode, the same pins carry address information, A[4] to A[7], from the single IC chip 5 to a PC card.

In an embodiment of the present invention, the PPIM 200 comprises an MPEG parallel-to-serial converter/multiplexer (MPSCM) 70, an MPEG serial-to-parallel converter/multiplexer (MSPCM) 80, and a CPU/OOB/Upstream muxed interface (COUMI) 90 which support the POD mode of the single IC chip 5.

While in the POD mode, the CPU 60 in the BDSPM 100 communicates through the PPIM 200 to a CPU in the POD module 150 to coordinate activities and functions between the single IC chip 5 and the external POD module 150.

In an embodiment of the present invention, an encrypted serial MPEG transport stream from in-band receiver 30 is input to MSPCM 80 in PPIM 200. MSPCM 80 converts the serial MPEG transport stream to parallel MPEG transport signals and multiplexes the parallel MPEG transport signals to POD module 150. POD module 150 de-encrypts the parallel MPEG transport signals and sends the de-encrypted parallel MPEG transport signals to MPSCM 70 in PPIM 200.

MPSCM 70 multiplexes the de-encrypted parallel MPEG transport signals from the POD module 150 and converts the de-encrypted parallel MPEG transport signals to a de-encrypted serial MPEG transport stream and sends the de-encrypted serial MPEG transport stream to transport processor 20 in BDSPM 100. Transport processor 20 generates a parsed serial MPEG transport stream from the de-encrypted serial MPEG transport stream and sends the parsed stream to MPEG Decoder/Video Encoder 10 for audio and/or video decoding (i.e. decompression) and/or video encoding.

In an embodiment of the present invention, conditional access may be provided using the OOB channels. Digital OOB signals from OOB receiver 40 are transmitted to COUMI 90 and multiplexed to POD module 150. The OOB signals may contain programming information from the headend. For example, the headend may download a key or code to the POD through the single IC chip 5 to enable de-encryption of a particular cable channel such as a pay-per-view channel.

In an embodiment of the present invention, the POD module 150 may also send digital upstream signals to single IC chip 5 that are multiplexed through COUMI 90 to upstream RF module 50. Upstream RF module 50 converts the digital upstream signals to upstream RF signals that are transmitted to the headend 10. For example, the upstream signals may contain user request information, such as requesting that an additional channel (e.g. a pay-per-view channel) be de-encrypted by POD module 150.

Figure 5:
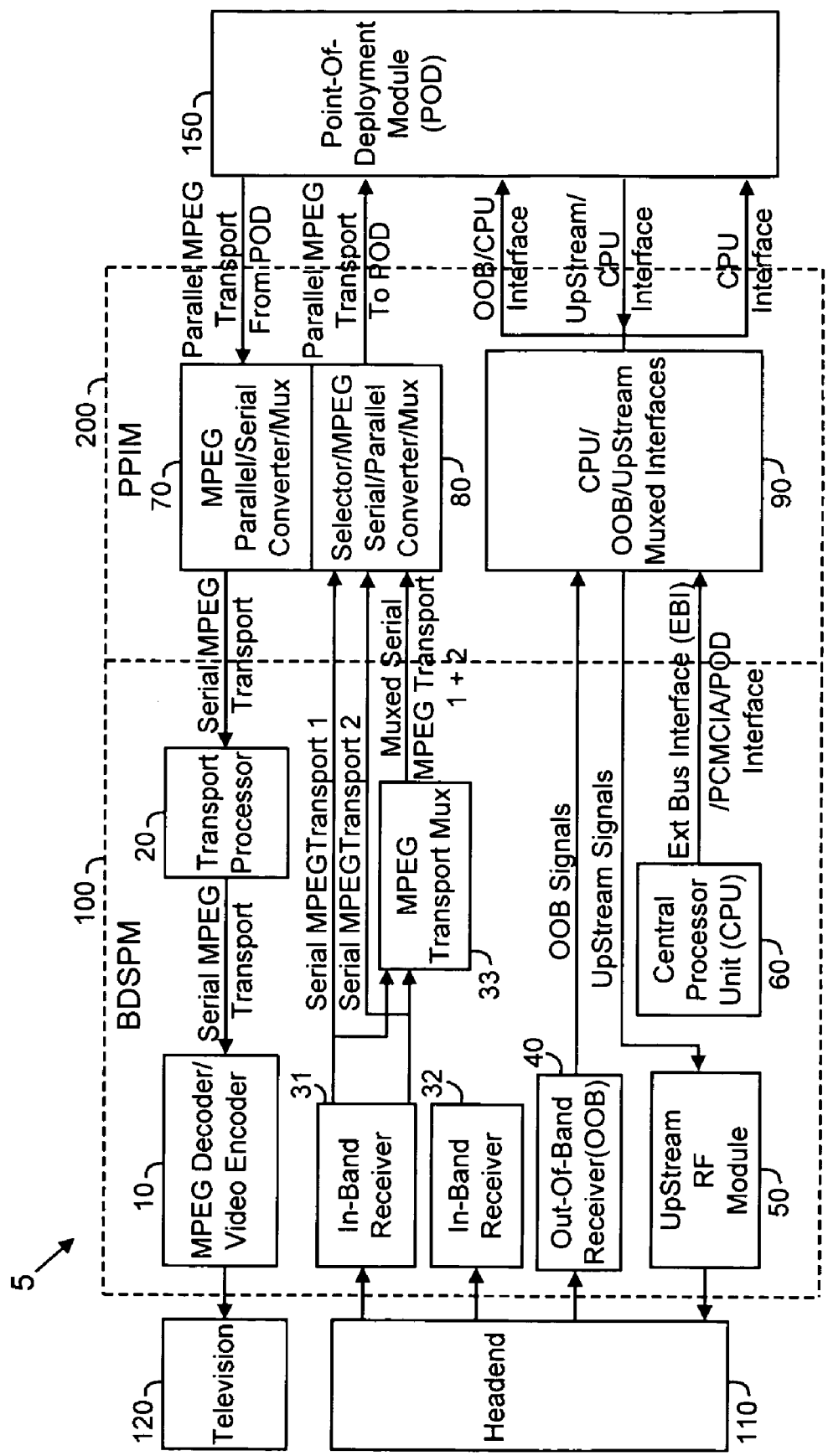
FIG. 5 is a schematic block diagram of an alternative embodiment of a single IC chip apparatus processing broadband signals from a headend and interfacing to a POD module in accordance with an embodiment of the present invention.

FIG. 5 is a schematic block diagram of an alternative embodiment of a single IC chip 5 processing broadband signals from a headend I/O and interfacing to a POD module 150 in accordance with an embodiment of the present invention. In FIG. 5, two in-band receivers 31 and 32 are shown, each generating a serial MPEG transport stream that are sent to PPIM 200. Also, MPEG Transport Multiplexer (MTM) 33 combines the two streams and sends the resultant combined stream to PPIM 200. MSPCM 80 selects one of the three transport streams for subsequent MPEG serial-to-parallel conversion and multiplexing to the POD module 200.

In other embodiments of the present invention, the single IC chip 5 may generate more than two serial MPEG transport streams and multiplex various combinations of them to POD module 150.

As an alternative embodiment, the single IC chip 5 may support the multiplexing of other functional signals onto the existing shared pins of single IC chip 5 in addition to PC card signals and POD signals. In other words, other functional modes may also be supported by sharing of pins.

As a further alternative embodiment, the single IC chip 5 may support a PCMCIA PC-card mode and a POD mode by having dedicated pins for each mode. No multiplexing or sharing of pins is performed to accommodate the two modes in the single IC chip 5.

The various elements of the single IC chip 5 may be combined or separated according to various embodiments of the present invention. For example, transport processor 20 may be combined with MPEG Decoder/Video Encoder 10 in accordance with an embodiment of the present invention.

In summary, certain embodiments of the present invention afford an approach to configure a single IC chip, processing broadband signals in a set-top box, to a PCMCIA PC-card mode or a POD mode and to multiplex PC card signals or POD-compatible signals within the single IC chip to certain pins of the single IC chip in order to interface with a PC card in the PCMCIA PC-card mode or a POD module in the POD mode.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. In an interactive broadband set-top box receiving broadband signals from a headend, apparatus within a single IC chip to facilitate communications with an installed card within said set-top box, said apparatus comprising:
   a broadband digital signal processing module (BDSPM) residing on said single IC chip to process said broadband signals; and
   a PC-card/POD interface module (PPIM) residing on said single IC chip and interfacing to said BDSPM and capable of being configured to operate in a PCMCIA PC-card mode and a POD mode, along with said BDSPM, in order to communicate with said installed card by multiplexing PC card signals or POD-compatible signals to said installed card, wherein said PC-card/POD interface module is operable to:

configure the single IC chip for operation in the PCM-CIA PC-card mode in the absence of an installed card;
detect presence of an installed card;
identify whether the installed card is PC card or POD module; and
re-configure the single IC chip to the POD mode if the installed card is a POD module.

2. The apparatus of claim 1 wherein said BDSPM comprises an in-band receiver to generate at least one serial MPEG transport stream from said broadband signals.

3. The apparatus of claim 1 wherein said BDSPM comprises a CPU to control functionality of said single IC chip.

4. The apparatus of claim 1 wherein said PPIM multiplexes PC card signals or POD-compatible signals, generated within said single IC chip, to/from said installed card and performs MPEG serial-to-parallel transport stream conversion and MPEG parallel-to-serial transport stream conversion.

5. The apparatus of claim 1 wherein said BDSPM comprises a transport processor to generate at least one parsed serial MPEG transport stream from an unparsed serial MPEG transport stream.

6. The apparatus of claim 1 wherein said BDSPM comprises an MPEG decoder/video encoder to decompress a parsed serial MPEG transport stream and to convert said parsed serial MPEG transport stream to a video format for display.

7. The apparatus of claim 1 wherein said BDSPM comprises an upstream RF module to generate upstream RF signals, to be sent to said headend, from digital upstream signals multiplexed through said PPIM from said installed card.

8. The apparatus of claim 1 wherein said BDSPM comprises an MPEG transport multiplexer to combine at least two of a plurality of serial MPEG transport streams generated within said BDSPM for subsequent serial-to-parallel conversion within said PPIM.

9. The apparatus of claim 1 wherein said PPIM comprises an MPEG serial-to-parallel converter/multiplexer to convert a serial MPEG transport stream, received from said BDSPM in said POD mode, into parallel MPEG transport signals to be multiplexed to said installed card.

10. The apparatus of claim 1 wherein said PPIM comprises an MPEG parallel-to-serial converter/multiplexer to convert parallel MPEG transport signals, multiplexed from said installed card in said POD mode, into a serial MPEG transport stream to be sent to said BDSPM.

11. The apparatus of claim 1 wherein said PPIM comprises a Selector/MPEG Serial-to-Parallel Converter/Multiplexer to select one of a plurality of serial MPEG transport streams generated within said BDSPM and to convert said one into parallel MPEG transport signals to be multiplexed to said installed card.

12. In an interactive broadband set-top box receiving broadband signals from a headend, apparatus within a single IC chip to facilitate communications with an installed card within said set-top box, said apparatus comprising:
a broadband digital signal processing module (BDSPM) residing on said single IC chip to process said broadband signals; and
a PC-card/POD interface module (PPIM) residing on said single IC chip and interfacing to said BDSPM and capable of being configured to operate in a PCMCIA PC-card mode and a POD mode, along with said BDSPM, in order to communicate with said installed card, wherein said PC-card/POD interface module is operable to:
configure the single IC chip for operation in the PCM-CIA PC-card mode in the absence of an installed card;
detect presence of an installed card;
identify whether the installed card is PC card or POD module; and
re-configure the single IC chip to the POD mode if the installed card is a POD module.

13. The apparatus of claim 2, wherein the BDSPM receives out-of-band signals within the broadband signals, and further comprises an out of band receiver for receiving the out-of-band signals, and wherein the out of band receiver is separate from the in-band receiver.

14. The apparatus of claim 12, wherein the BDSPM receives out-of-band signals within the broadband signals, and further comprises an out of band receiver for receiving the out-of-band signals.

* * * * *